United States Patent [19]

Katsurai et al.

[11] Patent Number: 4,679,053

[45] Date of Patent: Jul. 7, 1987

[54] THERMAL VARIABLE VELOCITY PRINTER SYSTEM

[75] Inventors: Junji Katsurai, Hachioji; Masao Monma, Kanagawa; Tetsuo Takaku, Tsurugashima, all of Japan

[73] Assignee: Konishiroku Photo Industry Co., Ltd., Tokyo, Japan

[21] Appl. No.: 806,119

[22] Filed: Dec. 6, 1985

Related U.S. Application Data

[63] Continuation of Ser. No. 682,265, Dec. 17, 1984, abandoned.

[30] Foreign Application Priority Data

Dec. 29, 1983 [JP] Japan ........................ 58-249904

[51] Int. Cl.⁴ ........................ G01D 15/10; B41J 3/20

[52] U.S. Cl. ........................ 346/1.1; 346/76 PH; 400/120

[58] Field of Search ........................ 346/1.1, 76 PH; 400/120

[56] References Cited

U.S. PATENT DOCUMENTS

| | | | |
|---|---|---|---|
| 3,813,677 | 5/1974 | Shimotsuma | 346/76 R |
| 3,938,641 | 2/1976 | Fulton | 364/900 |
| 4,224,628 | 9/1980 | Murray | 346/76 PH |
| 4,284,876 | 8/1981 | Ishibashi et al. | 219/216 |
| 4,300,142 | 11/1981 | Kos | 346/76 PH |
| 4,443,121 | 4/1984 | Arai | 400/120 |

*Primary Examiner*—E. A. Goldberg
*Assistant Examiner*—Gerald E. Preston
*Attorney, Agent, or Firm*—Frishauf, Holtz, Goodman & Woodward

[57] ABSTRACT

A recording system for driving heating elements of a thermal printing head such that the recording intensity is substantially the same at two different recording speeds. One of at least two given recording character modes is selectively set, each of the recording character modes setting a given different recording speed. At least the pulse amplitude of a driving electric power signal, which is selectively applied to the heating elements of the thermal head, is varied in accordance with the set recording character mode while keeping the pulse cycle of the driving electric power signal at a predetermined substantially constant period. The pulse amplitude of the driving electric power signal has a higher value when recording at a higher speed and a lower value when recording at a lower speed. In addition to controlling the amplitude of the driving electric power signal, it is possible to further control the pulse widths of the pulses forming the driving electric power signal.

13 Claims, 7 Drawing Figures

THERMAL VARIABLE VELOCITY PRINTER SYSTEM

This application is a continuation of application Ser. No. 682,265, filed Dec. 17, 1984, now abandoned.

BACKGROUND OF THE INVENTION

1. Field of the Invention

This invention relates to a thermal printer using a thermal head of which a heating element is selectively driven.

2. Description of the Prior Art

Heretofore, thermal printers are constructed so that a thermal transfer recording may be performed on a material to be recorded by making use of a thermal head of which a heating element is selectively driven and by pressing the thermal head against an ink ribbon for thermal transfer use, or by pressing the thermal head directly against a sheet of thermal transfer recording paper.

The schematic construction of such a thermal printer as mentioned above is variously illustrated in FIGS. 1 through 3, respectively. In these drawings, 1 is a plate against which a sheet of recording paper 3 is pressed by paper-weight rollers 2; 4 is a cassette containing a thermal transfer ink ribbon 5; rectangular notch 6 (FIG. 3) is provided at the center of one side of cassette 4; ink ribbon 5 is exposed to the outside of the printer at notch 6; one end of ink ribbon 5 is fixed to take-up roller 7 and another end to feed roller 8, respectively; take-up roller 7 is rotated manually with knob 19 if occasion demands and at the same time it is rotated by ink ribbon take-up shaft 9 when printing forward (i.e., when printing toward the right hand side in FIGS. 1 and 3); 10 is a cassette holder which is fixed to carriage 11; cassette 4 is put into cassette holder 11 with the help of positioning pin 12; carriage 11 is guided to travel in the transverse direction as shwon in FIGS. 1 and 3, along guide shaft 13; carriage 11 is driven to travel as timing belt 16 suspended between driving pulley 14 and driven pulley 15 and fastened to carriage 11 is moved by motor 17 through driving pulley 14; driving pulley 14 and driven pulley 15 are provided with cogs in a desired shape and timing belt 16 is also provided at the inner surface thereof with cogs capable of gearing smoothly into the cogs of the two pulleys 14, 15; 18 is a thermal head arranged in the space between notch 6 of cassette 4 and ink ribbon 5 and the lower part of the thermal head is so pivotally attached as to be tilt-free to carriage 11; thermal head 18 is constantly biased by a spring (not shown) so as to keep clear of ink ribbon 5 (i.e., it is so biased as to keep such a position as shown in FIG. 2), and when printing forward (i.e., when printing toward the right hand side in FIGS. 1 and 3), thermal head 18 is forcibly tilted to the side of ink ribbon 5 by utilizing a solenoid or the like so as to press the heating element against the back surface (i.e., the uninked surface) of ink ribbon 5 and to press a sheet of recording paper 3 against platen 1 and thereby to bring the front surface of ink ribbon 5 into contact with the recording paper 3; 20 is a felt rod and 21 is a felt sheet, and they are brought into contact with both sides of ink ribbon 5 by utilizing the elasticity of leaf spring 22, so that dust and the like adhered to ink ribbon 5 may be removed thereby.

A recording operation with such a thermal transfer printer constructed as mentioned above is carried out by making carriage 11 travel in the transverse direction as shown in FIGS. 1 and 3 and intermittently driving platen 1 to rotate in the direction of the arrow shown in FIG. 1 every time when printing is completed on one transverse line. When printing backward, (i.e., when printing from the right to the left as shown in FIGS. 1 and 3), no thermal transfer is carried out, because thermal head 18 is separated from ink ribbon 5. With such a thermal printer as mentioned above, there are frequent occasions when high-density pica leters (hereinafter called HD pica) or high-speed pica letters (hereinafter called HS pica) are recorded in a HD pica mode or in a HS pica mode respectively set by an escape sequence applied from a host computer to which the thermal printer is connected. In the case of recording in the HS pica mode at a speed of the order of from 1.2 to 1.3 times faster than that in the HD pica mode, any of the density difference between the modes is negligible. However, when the speed is HS pica mode becomes 1.5 to 2 times or more faster than in HD pica mode, the recording density of the HS pica becomes lower than that of the HD pica, provided that a driving electric power applied to the heating element of the thermal head is kept constant. A similar problem also arises in the case of using such a thermal printer so constructed as a mode or to manually switch the HS pica mode over to the HD pica mode or vice versa. To cope therewith, for example, it is put into practice to shape up the pulse amplitude or pulse duration of driving electric power applied to the heating element of a thermal printer, every time by an operator, according respectively to each recording density of HS pica and HD pica.

According to such a conventional construction as mentioned above, however, a recording density adjusted by the operator does not correspond to a recording mode set by the host computer, if the recording mode varies during the recording operation, so that there may be a fear of recording density variations between the HS pica and the HD pica. In the case of switching a mode over to another by hand, a recording density is varied unless the density is adjusted every time by hand, thereby causing trouble.

This invention has been achieved by taking the above-mentioned points into consideration.

OBJECTS OF THE INVENTION

It is accordingly a general object of the invention to provide a thermal printer capable of obtaining a certain recording density even when a recording speed is varied in a printing operation, and more particularly to provide a thermal printer capable of obtaining a certain recording density even when a recording speed is varied by changing a recording mode, in a recording operation.

SUMMARY OF THE INVENTION

The invention capable of achieving the above-mentioned object is characterized by providing a thermal printer using a thermal head whose heating element is selectively driven with a means for controlling a driving electric power which is to be applied to the heating element of the thermal head according to the recording mode information incorporated in a printing instruction.

BRIEF DESCRIPTION OF THE DRAWINGS

FIGS. 5, 6 and 7 each is an example of driving electric power pulse waveforms wherein FIG. 5 is that in an HD pica recording mode and FIGS. 6 and 7 each is a pulse waveform in an HS pica recording mode.

DETAILED DESCRIPTION OF THE INVENTION

Figure 1:
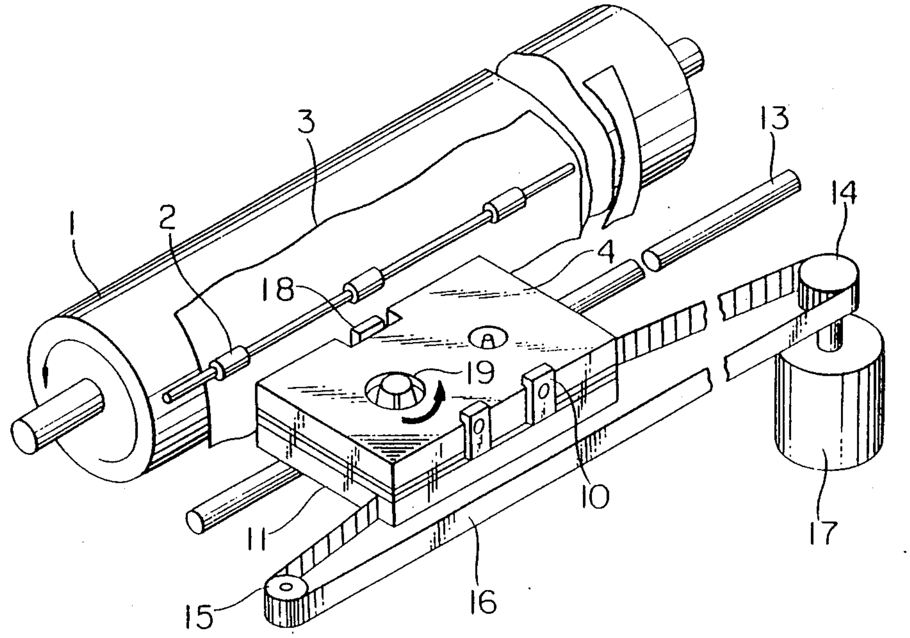
FIG. 1 (PRIOR ART)
FIG. 1 is a perspective view illustrating the substantial part of a conventional type of thermal transfer printer.
Figure 2:
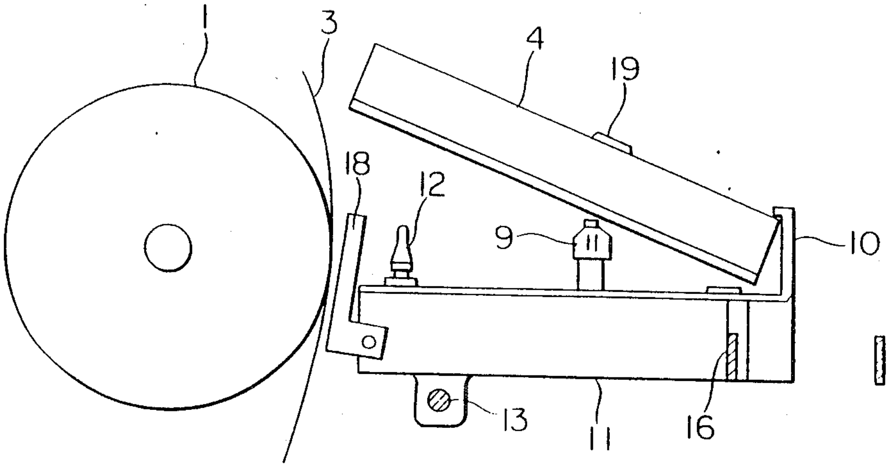
FIG. 2 (PRIOR ART)
FIG. 2 is a side view of the apparatus illustrated in FIG. 1, showing a state where a cassette is lifted up.
Figure 3:
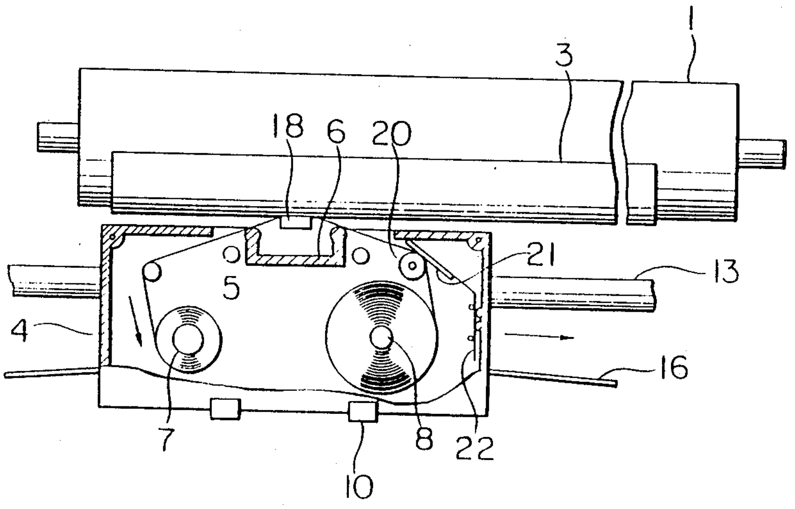
FIG. 3 (PRIOR ART)
FIG. 3 is a partially cutaway plan view of the apparatus of FIG. 1.
Figure 4:
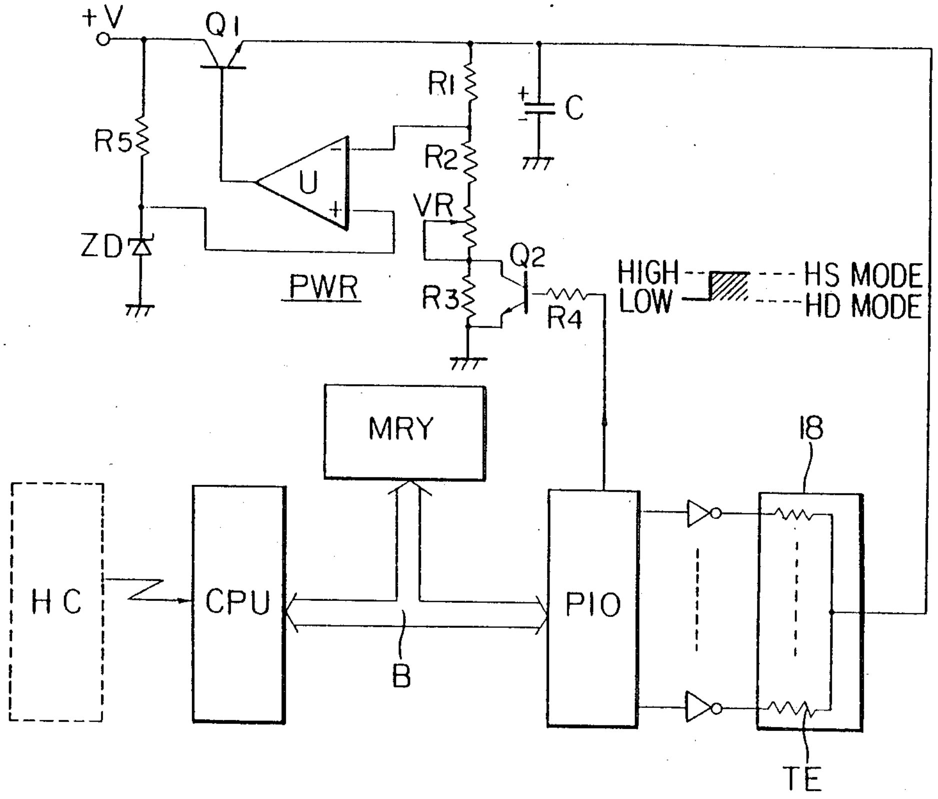
FIG. 4 is a circuit diagram of an example of the invention.

FIG. 4 is a circuit diagram illustrating an embodiment of the invention, wherein, processor CPU is to perform an internal process required for a recording operation and at the same time to control the intensity of a driving electric power applied to heating elements TE of thermal head 18 according to an HD pica recording mode or an HS pica recording mode established by an escape sequence given from host computer HC or by switching by hand. Processor CPU is connected with a memory MRY and an interface PIO through bus B. The outlet port of interface PIO is connected to the base of transistor $Q_2$ which forms part of a power circuit PWR for the thermal head through resistor $R_4$. In the thermal head power circuit PWR, resistor $R_5$ and Zener diode ZD are connected in series between a power terminal $+V$ and a grounding potential point, and the mid point of connection is connected to the non-inversion input terminal of an arithmetic and logic amplifier U. The collector of transistor $Q_1$ is connected to power terminal $+V$, the base is connected to the outlet terminal of arithmetic and logic amplifier U, and the emitter is connected to the inversion input terminal of arithmetic and logic amplifier U through resistor $R_1$. Resistor $R_2$, variable resistor VR and resistor $R_3$ are connected in series between resistor $R_1$ and grounding potential point. The collector of transistor $Q_2$ is connected to the point where variable resistor VR is connected to resistor $R_3$, and the emitter thereof is connected to the grounding potential point. One end of capacitor C is connected to the point where the emitter of transistor $Q_1$ is connected to resistor $R_1$ and at the same time to the common connected point of heating elements TE of thermal head 18. The other end of capacitor C is connected to the grounding potential point. The other ends of heating elements TE of thermal head 18 are connected to interface PIO.

Figure 5:
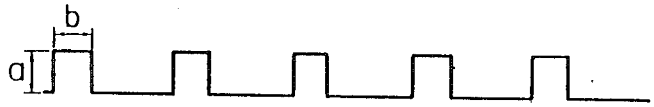
Figure 6:
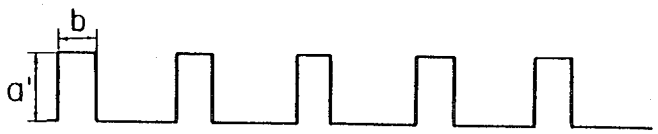

In such a structure as mentioned above, in an HD pica recording mode, an output signal of "L" level is given from the output port of interface PIO so as to make transistor $Q_2$ be in the OFF state, and in an HS pica recording mode, an output signal of "H" level is given from the output port of interface PIO so as to make transistor $Q_2$ be in the ON state. Accordingly, for example, a low voltage having such an amplitude a as shown in FIG. 5 is generated in the HD pica recording mode, and a high voltage having such an ampliude a' which is higher than a as shown in FIG. 6 is generated, and it is, therefore, possible to automatically obtain the same recording density also in the HS pica recording mode as a recording density desirably selected by an operator in the HD pica recording mode.

Figure 7:
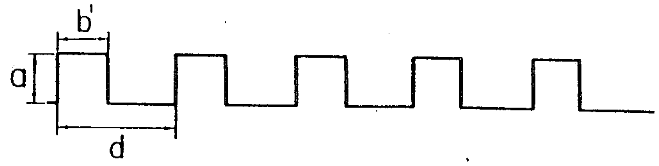

An intensity of driving electric power to be applied to heating elements TE of thermal head 18 may also be adjusted by controlling pulse widths in a state where the amplitude is kept to be constant. If a signal given in an HD pica recording mode is as shown in FIG. 5, the signal given in an HS pica recording mode will have a waveform such as shown in FIG. 7. The intensity may further be adjusted by controlling both amplitudes and pulse widths. However, when thermal head 18 is driven at a high speed, it is desired to control the amplitude as illustrated in this example, taking the thermoresponse property of thermal head 18 into consideration, because when a driving pulse period is set at 2 ms and a duty (i.e., a ratio of pulse width to a period, that is a ratio of $b'/d \times 100$ in FIG. 7) is not less than 50%, for example, the pulse width will not be less than 1 ms, so that it is not preferred from the viewpoint of heat storage property.

In the case of using a thermal transfer printer, an excellent record can be produced by prolonging a time of applying a driving electric power thereto and making the amplitudes of driving pulses as low as possible.

As described above, according to this invention, a thermal printer is capable of obtaining a constant recording density even when a recording mode is varied in a recording operation.

What is claimed is:

1. In a method of recording with a thermal printer having a thermal head having heating elements, wherein a printing is performed by selectively driving said heating elements, said method of recording comprising:
   - generating a driving electric power signal and selectively applying said power signal to said heating elements;
   - selectively setting one of at least two given recording character modes, each of which sets a given different recording speed; and
   - controlling at least the pulse amplitude of said driving electric power signal applied to said heating elements of said thermal head in accordance with said set recording character mode while keeping the pulse cycle of said driving electric power signal at a predetermined substantially constant period, said pulse amplitude having a higher value when recording at a higher speed and a lower value when recording at a lower speed.

2. A method of recording with a thermal printer as claimed in claim 1, wherein said controlling step comprises controlling the pulse amplitude of said driving electric power signal in accordance with recording mode information incorporated in a printing instruction.

3. A method of recording with a thermal printer as claimed in claim 2, wherein said controlling step further comprises controlling pulse widths of said driving electric power signal.

4. A method of recording with a thermal printer as claimed in claim 1, wherein said controlling step further comprises controlling pulse widths of said driving electric power signal.

5. A method of recording with a thermal printer as claimed in claim 1, wherein the duty ratio of the driving electric power signal applied to the heating elements is less than 50%.

6. In a thermal printer having a thermal head having heating elements whereby a printing is performed by selectively driving the heating elements,
   - the improvement wherein said thermal printer comprises:
   - means for generatng a driving electric power signal having a given pulse cycle period;

means for selectively applying said driving electric power signal to said heating elements;

means for selectively setting one of at least two given recording character modes, each of which sets a given different recording speed; and means for controlling at least the pulse amplitude of said driving electric power signal applied to said heating elements of said thermal head in accordance with said set recording character mode while keeping the pulse cycle of said driving electric power signal at a predetermined substantially constant period, said pulse amplitude having a higher value when recording at a higher speed and a lower value when recording at a lower speed.

7. A method of recording with a thermal printer as claimed in claim 5, wherein said controlling step further comprises controlling the duty ratio of the driving electric power signal applied to the heating elements.

8. The method of recording with a thermal printer as claimed in claim 1, wherein said driving electric power signal applied to the heating elements has a duty ratio, and wherein said controlling step further comprises controlling said duty ratio of said driving electric power signal.

9. The thermal printer of claim 6, wherein said setting means is responsive to a printing instruction.

10. The printing apparatus of claim 6, wherein said controlling means further comprises means for controlling pulse widths of said driving electric power signal.

11. The printing apparatus of claim 6, wherein the driving electric power signal applied to the heating elements has a duty ratio which is less than 50%.

12. The printing apparatus of claim 11, wherein said controlling means further comprises means for controlling the duty ratio of said driving electric power signal.

13. The printing apparatus of claim 6, wherein said driving electric power signal applied to the heating elements has a duty ratio, and wherein said controlling means further comprises means for controlling said duty ratio.

* * * * *